(12) United States Patent
Lo (10) Patent No.: US 10,678,079 B2
(45) Date of Patent: Jun. 9, 2020

(54) CURVED BEZEL AND CURVED DISPLAY APPARATUS USING THE SAME

(71) Applicants: HKC Corporation Limited, Shenzhen, Guangdong (CN); Chongqing HKC Optoelectronics Technology Corporation Limited, Chongqing (CN)

(72) Inventor: Hsu-Kang Lo, Chongqing (CN)

(73) Assignees: HKC CORPORATION LIMITED, Shenzhen, Guangdong (CN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 405 days.

(21) Appl. No.: 15/540,996

(22) PCT Filed: Feb. 26, 2017

(86) PCT No.: PCT/CN2017/074910
§ 371 (c)(1),
(2) Date: Jun. 29, 2017

(87) PCT Pub. No.: WO2018/107582
PCT Pub. Date: Jun. 21, 2018

(65) Prior Publication Data
US 2019/0391438 A1    Dec. 26, 2019

(30) Foreign Application Priority Data

Dec. 16, 2016 (CN) .......................... 2016 1 1168834

(51) Int. Cl.
*G02F 1/1333* (2006.01)
*G02F 1/13357* (2006.01)

(52) U.S. Cl.
CPC ...... *G02F 1/133308* (2013.01); *G02F 1/1336* (2013.01); *G02F 2001/133314* (2013.01)

(58) Field of Classification Search
CPC ............. G02F 1/133308; G02F 1/1336; G02F 2001/133314
See application file for complete search history.

(56) References Cited

U.S. PATENT DOCUMENTS 7,545,629 B1 * 6/2009 Bauer, Jr. .............. G06F 1/1616
349/58
10,078,237 B2 * 9/2018 Li ..................... G02F 1/133308
(Continued)

FOREIGN PATENT DOCUMENTS

CN  103934319 A  7/2014
CN  103941456 A  7/2014
(Continued)

OTHER PUBLICATIONS

International Search Report for PCT/CN2017/074910, dated Sep. 6, 2017.

*Primary Examiner* — Mary Ellen Bowman
(74) *Attorney, Agent, or Firm* — Juan Carlos A. Marquez; Marquez IP Law Office, PLLC (57) ABSTRACT

This application relates to a curved bezel and a curved display apparatus using the same. The curved bezel includes: at least one fixing plate member, being a plate and bent of at least one bending angle to form at least one bending, the fixing plate member includes a plurality of fixing members positioned at a periphery of the plate; and a bezel, including a plurality of fasteners corresponding to the fixing members configured to fix with the fasteners, so that the bezel has a curvature same as a curvature of the fixing plate member.

15 Claims, 6 Drawing Sheets

(56) References Cited

U.S. PATENT DOCUMENTS

| | | | | |
|---|---|---|---|---|
| 2005/0110917 A1* | 5/2005 | Shida | ............... | G02F 1/133308 |
| | | | | 349/58 |
| 2009/0154179 A1* | 6/2009 | Lee | ................... | G02F 1/133308 |
| | | | | 362/432 |
| 2009/0190062 A1* | 7/2009 | Sudo | ................ | G02F 1/133308 |
| | | | | 349/58 |
| 2012/0002129 A1* | 1/2012 | Azai | ................ | G02F 1/133308 |
| | | | | 349/58 |
| 2015/0212361 A1* | 7/2015 | Zhao | ................ | G02F 1/133308 |
| | | | | 349/58 |
| 2016/0085110 A1* | 3/2016 | Shin | ................. | G02F 1/133308 |
| | | | | 349/58 |

FOREIGN PATENT DOCUMENTS

| | | | |
|---|---|---|---|
| CN | 103985313 A | 8/2014 | |
| CN | 203910187 U | 10/2014 | |
| CN | 105160999 A | 12/2015 | |
| CN | 105700214 A | 6/2016 | |

\* cited by examiner

CURVED BEZEL AND CURVED DISPLAY APPARATUS USING THE SAME

BACKGROUND

Technical Field

This application relates to a bezel, and in particular, to a curved bezel and a curved display apparatus using the same.

Related Art

In recent years, with the improvement of the flat panel display technologies, manufacturers successively launch large-size liquid crystal display panels. When a user is watching a television, the distance between an image at the edge of a television screen and eyes of the user becomes larger, resulting in deformation and distortion of the edge image. Compared with a flat panel, a better viewing effect can be achieved by using a designed curved display apparatus.

In the existing curved surface technologies, the backplane structure of a backlight module is usually implemented by using one of the following two methods. The first method is to form a curved structure by bonding a plurality of segments of bent metal plates. However, this method has such problems as unstable curvature accuracy, excessive parts, and difficulty in processing. The second method is to directly form an integrally curved metal backplane by using a mold. However, this method is disadvantageous in that, the integrally formed metal backplane has an unduly large weight and requires high material costs, and after the integrally formed curved bezel is formed, the curvature of the formed backplane is likely to be unstable due to poor stress release of the metal material of the backplane.

SUMMARY

To resolve the foregoing technical problem, an objective of this application is to provide a bezel, and in particular, this application relates to a curved bezel. After a fixing plate member including a fixed curvature is fixed to a bezel, the bezel has a curvature same as a curvature of the fixing plate member, so that a disadvantage of an unstable curvature of a curved bezel member is alleviated, and the weight of the bezel is reduced, thereby reducing the weight of an entire machine. An obvious effect is achieved when a large curved liquid crystal display panel is used. In addition, a same bezel includes fixing plate members including different curvatures, so that an effect of variable curvatures of a module is achieved. Further, for the bezel provided in this application, in addition to that through-holes of the bezel are snapped and combined with fixing members, another effect is to effectively reduce stress generated in the bezel, so as to achieve a stable curvature.

The objective of this application is achieved and the technical problem is resolved by using the following technical solutions. This application provides a curved bezel, comprising: at least one fixing plate member, being a plate and bent of at least one bending angle to form at least one bending, wherein the fixing plate member includes a plurality of fixing members positioned at a periphery of the plate; and a bezel, including a plurality of fasteners corresponding to the fixing members configured to fix with the fasteners.

A curved display apparatus comprises: a display panel; and a backlight module, including a curved bezel, where the curved bezel includes: at least one fixing plate member, wherein the fixing plate member is a plate and bent of at least one bending angle to form at least one bending, wherein the fixing plate member includes a plurality of fixing members positioned at a periphery of the plate; and a bezel, including a plurality of fasteners corresponding to the fixing members configured to fix with the fasteners.

A curved display device comprises: a curved display apparatus, where the curved display apparatus includes a display panel and a backlight module, the backlight module includes a curved bezel, and the curved bezel includes: at least one fixing plate member, wherein the fixing plate member is a plate and bent of at least one bending angle to form at least one bending, wherein the fixing plate member includes a plurality of fixing members positioned at a periphery of the plate; and a bezel, including a plurality of fasteners t corresponding to the fixing members configured to fix with the fasteners.

The objective of this application may be further achieved and the technical problem may be further resolved by using the following technical measures.

In an embodiment of this application, the plate has a rectangular shape, and the bending is parallel to both side edges of the plate.

In an embodiment of this application, the bending is located in the center of the plate, so that the plate is symmetrically bent.

In an embodiment of this application, the bending angle is in a range of 0 degrees to 45 degrees.

In an embodiment of this application, the fixing members and the fasteners mutually form a snapping structure, the fixing members are snapping members, and the fasteners are a plurality of through-holes, and the snapping members are snapped with the through-holes, so that the fixing plate member is fixed to the bezel; and the fixing plate members are made of a metal material, where a gap between the fixing members is equal to a gap between the fasteners.

In an embodiment of this application, the fasteners are arranged on the bezel in an array manner.

In this application, after a fixing plate member having a fixed curvature is fixed to a bezel, the bezel has a curvature same as a curvature of the fixing plate member, so that a disadvantage of an unstable curvature of a curved bezel member is alleviated, and the weight of the bezel is reduced, thereby reducing the weight of an entire machine. An obvious effect is achieved when a large curved liquid crystal display panel is used. In addition, a same bezel includes fixing plate members having different curvatures, so that an effect of variable curvatures of a module is achieved. Further, for the bezel provided in this application, in addition to that through-holes of the bezel are snapped and combined with fixing members, another effect is to effectively reduce stress generated in the bezel, so as to achieve a stable curvature.

DETAILED DESCRIPTION

The following embodiments are described with reference to the accompanying drawings to give examples of specific embodiments that may be implemented in this application. The terms such as 'upper', 'lower', 'front', 'behind', 'left', 'right', 'internal', 'external', and 'side' provided in this application are merely directions with reference to the accompanying drawings. Therefore, the directional terms are used to illustrate and understand this application rather than to limit this application.

The accompanying drawings and the descriptions are substantially considered to be exemplary but not to be limiting. In the drawings, a unit having a similar structure is represented by a same reference numeral. In addition, for understanding and ease of description, the size and the thickness of each component shown in the accompanying drawings are arbitrarily shown, but this application is not limited thereto.

In the accompanying drawings, the thicknesses of layers, films, panels, regions, and the like are exaggerated for clarity. In the accompanying drawings, for understanding and ease of description, the thicknesses of some layers and regions are exaggerated. It should be understood that, when, for example, a component of a layer, a film, a region, or a substrate is "on" another component, the component may be directly on the another component, or there may be an intermediate component.

In addition, in this specification, unless explicitly described to the contrary, the word include will be understood to imply the inclusion of stated components but not the exclusion of any other components. In addition, in this specification, "on" means that a component is located on or below a target component, but does not mean that the component needs to be located on top of a gravity direction.

To further illustrate the technological means and effectiveness of this application taken to achieve a predetermined purpose of this application, with reference to the accompanying drawings and preferred embodiments, specific implementations, structures, features, and effectiveness of a curved bezel and a curved display apparatus using the same that are provided in this application are described below in detail.

Figure 1:
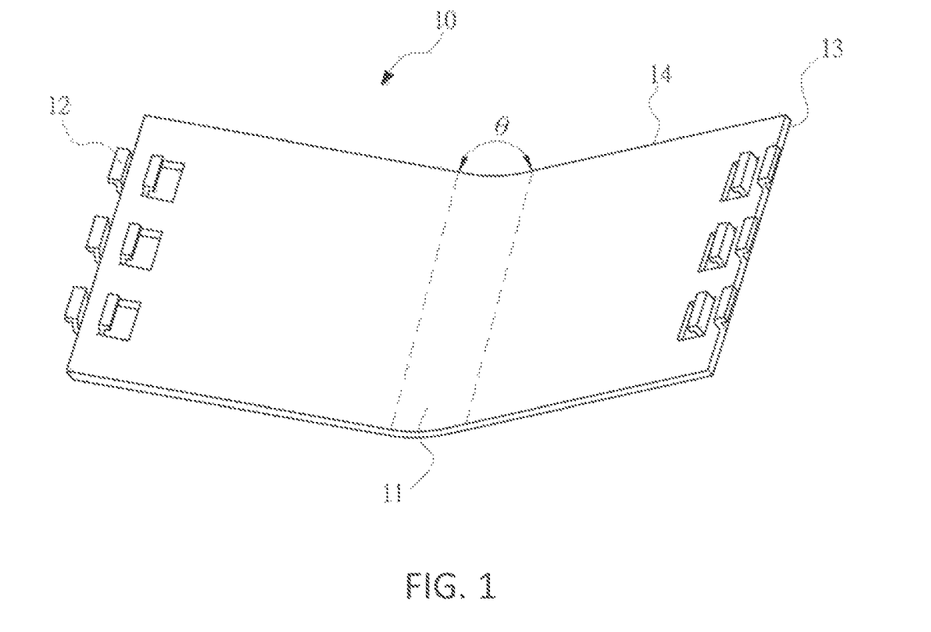
FIG. 1 is a schematic diagram of a fixing plate member of a curved bezel according to an embodiment of this application.
Figure 2:
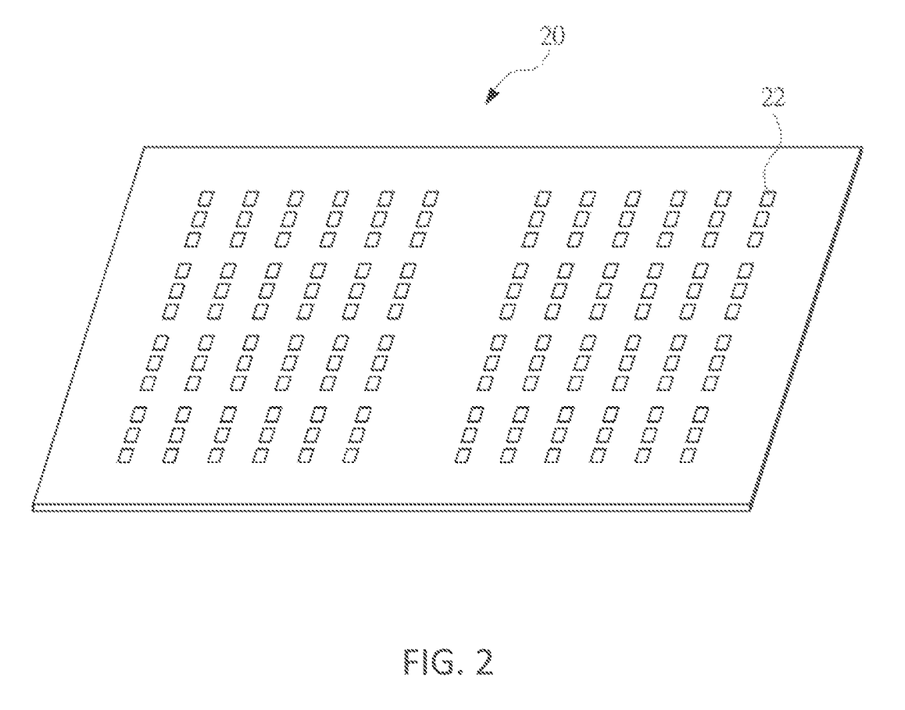
FIG. 2 is a schematic diagram of a bezel of a curved bezel according to an embodiment of this application.

First, referring to FIG. 1 and FIG. 2, FIG. 1 is a schematic diagram of a fixing plate member of a curved bezel according to an embodiment of this application, and FIG. 2 is a schematic diagram of a bezel of the curved bezel according to an embodiment of this application. The curved bezel of this application includes: at least one fixing plate member 10 and a bezel 20. The bezel 20 is a known backplane. The fixing plate member 10 is a plate, may be made of a metal material, the plate is bent of at least one bending angle θ to form at least one bending 11, wherein the fixing plate member includes a plurality of fixing members 12 positioned at a periphery of the plate. The bezel 20 includes a plurality of fasteners 22 corresponding to the fixing members 12 configured to fix with fasteners 22.

In an embodiment, a plurality of fixing plate members 10 may be used and fixed to a single bezel 20, to enhance fixation strength.

In an embodiment of this application, the plate has a rectangular shape, or may have a square shape. The bending 11 is parallel to both side edges 13 of the plate, that is, the bending 11 is perpendicular to upper and lower edges 14.

In an embodiment of this application, the bending 11 is located in the center of the plate, so that the plate is symmetrically bent. Especially, the fixing members 12 are separately located on peripheries at both sides of the plate by using the bending 11 as a reference.

In an embodiment of this application, the bending angle θ is less than 90 degrees. More precisely, the bending angle θ is in a range of 0 degrees to 45 degrees.

Figure 3:
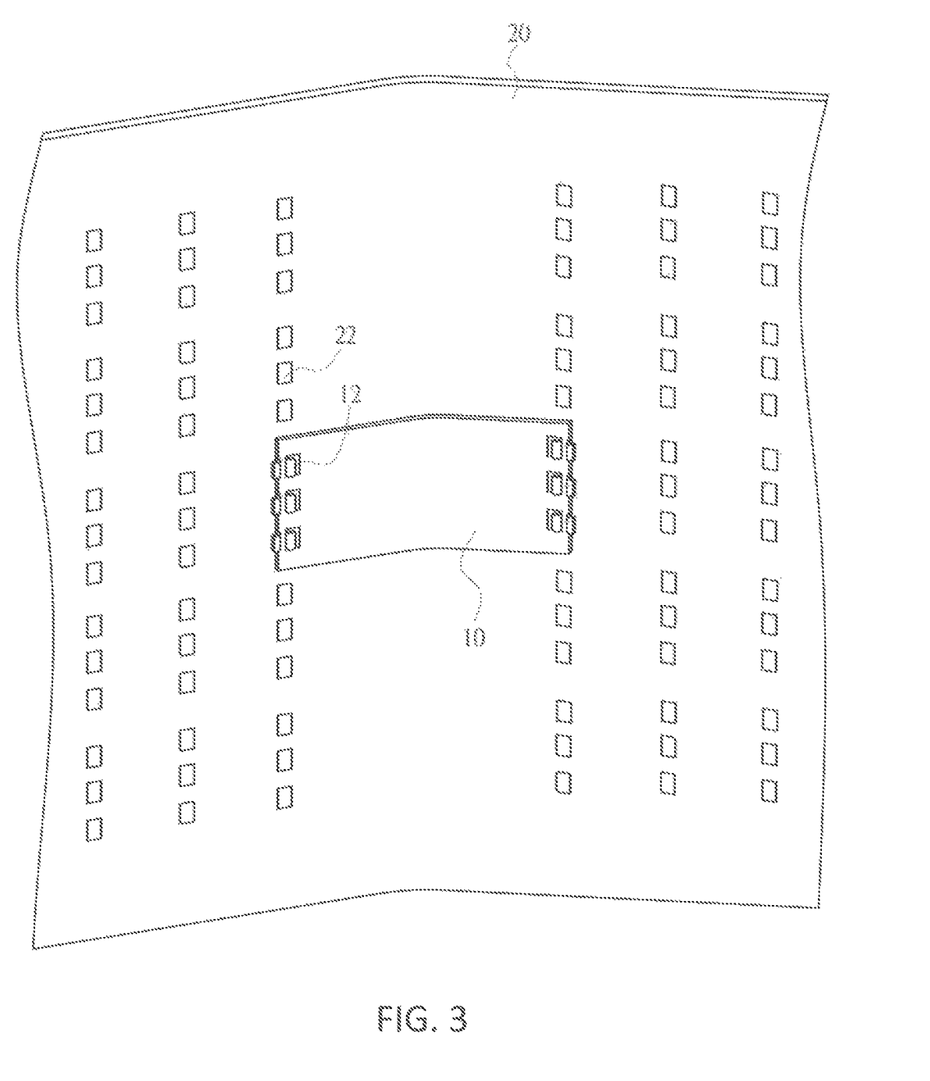
FIG. 3 is a schematic diagram of a curved bezel according to an embodiment of this application.
Figure 4:
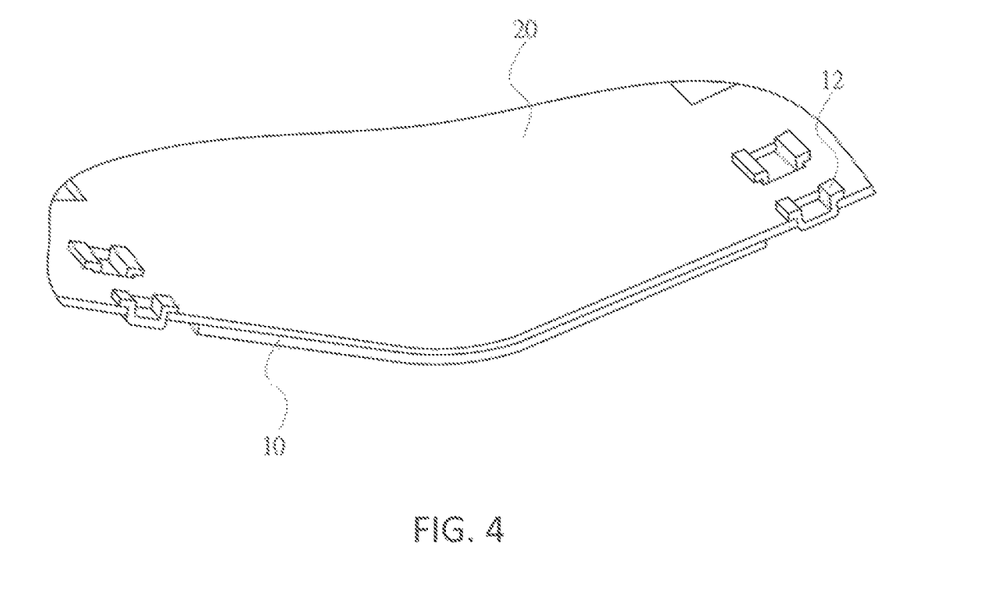
FIG. 4 is a schematic diagram of a fixing plate member fixed to a bezel according to an embodiment of this application.

Next, referring to FIG. 3 and FIG. 4, FIG. 3 is a schematic diagram of a curved bezel according to an embodiment of this application, and FIG. 4 is a schematic diagram of a fixing plate member fixed to a bezel according to an embodiment of this application. In an embodiment of this application, the fixing members 12 and the fasteners 22 mutually form a snapping structure. The fixing members 12 are snapping members, and the fasteners 22 are a plurality of through-holes. The snapping members are snapped with the through-holes, so that the fixing plate member 10 is fixed to the bezel 20. The fixing plate member 10 is made of a metal material. A gap between the fixing members 12 is equal to a gap between the fasteners 22.

In addition, the weight of the entire bezel may be reduced by providing a plurality of through-holes on the bezel 20, and the plurality of through-holes provided on the bezel 20 may also effectively reduce stress generated in the bezel, so as to achieve a stable curvature.

Figure 5:
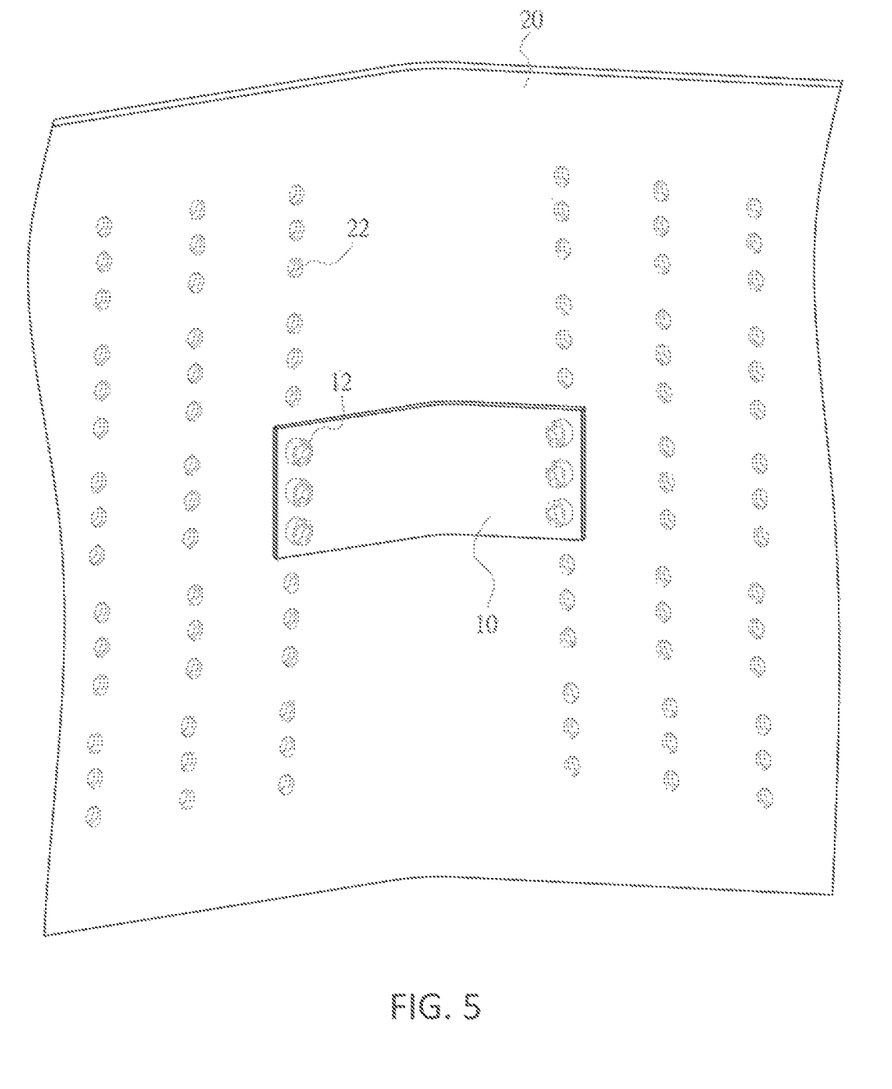
FIG. 5 is a schematic diagram of screw fastening of a curved bezel according to an embodiment of this application.
Figure 6:
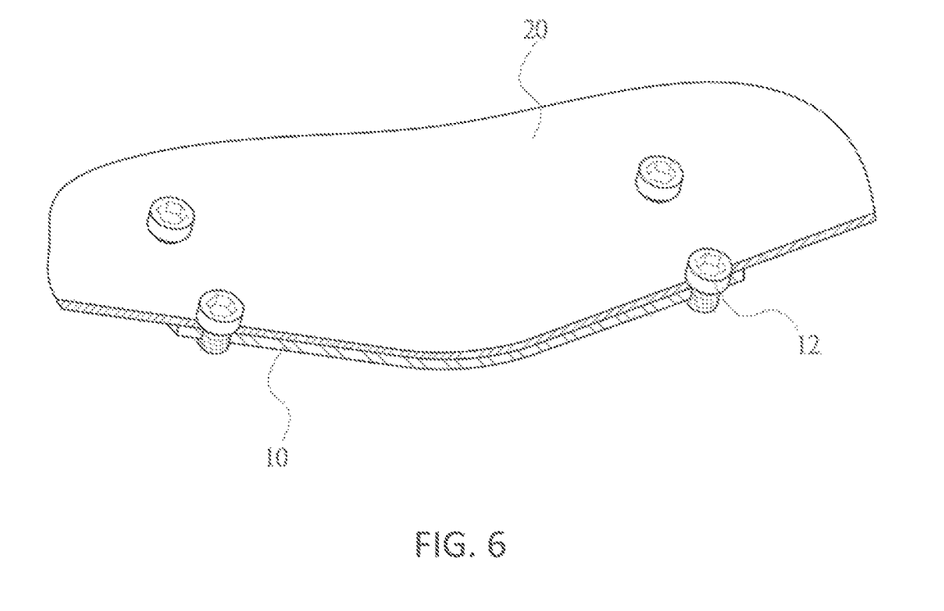
FIG. 6 is a schematic diagram of screw fastening of a fixing plate member fixed to a bezel according to an embodiment of this application.

Referring to FIG. 5 and FIG. 6, FIG. 5 is a schematic diagram of screw fastening of a curved bezel according to an embodiment of this application, and FIG. 6 is a schematic diagram of screw fastening of a fixing plate member fixed to a bezel according to an embodiment of this application. As described above, the fixing members 12 and the fasteners 22 mutually form a screw fastening structure, the fixing members 12 of the plate are screws, the fasteners 22 are a plurality of through-holes, and the screws are fastened to the through-holes, so that the fixing plate member is fixed to the bezel.

In an embodiment of this application, the fasteners are arranged on the bezel in an array manner. That is, the through-holes are arranged on the bezel in an array manner. A gap between the fixing members is equal to a gap between the fasteners.

According to the foregoing content, this application may further include a curved display apparatus. The curved display apparatus comprises: a display panel and a backlight module. The backlight module includes a curved bezel. Referring to FIG. 1 and FIG. 2 again, the curved bezel includes: at least one fixing plate member, being a plate and bent of at least one bending angle to form at least one bending, wherein the fixing plate member includes a plurality of fixing members positioned at a periphery of the plate; and a bezel, including a plurality of fasteners corresponding to the fixing members configured to fix with the fasteners.

In an embodiment of this application, the plate has a rectangular shape, or may have a square shape. The bending 11 is parallel to both side edges 13 of the plate, that is, the bending 11 is perpendicular to upper and lower edges 14.

In an embodiment of this application, the bending 11 is located in the center of the plate, so that the plate is symmetrically bent. Especially, the fixing members 12 are separately located on peripheries at both sides of the plate by using the bending 11 as a reference.

In an embodiment of this application, the bending angle θ is less than 90 degrees. More precisely, the bending angle θ is in a range of 0 degrees to 45 degrees.

Next, referring to FIG. 3 and FIG. 4, FIG. 3 is a schematic diagram of a curved bezel according to an embodiment of this application, and FIG. 4 is a schematic diagram of a fixing plate member fixed to a bezel according to an embodiment of this application. In an embodiment of this application, the fixing members 12 and the fasteners 22 mutually form a snapping structure. The fixing members 12 are snapping members, and the fasteners 22 are a plurality of through-holes. The snapping members are snapped with the through-holes, so that the fixing plate member 10 is fixed to the bezel 20. The fixing plate member 10 is made of a metal material.

Referring to FIG. 5 and FIG. 6, FIG. 5 is a schematic diagram of screw fastening of a curved bezel according to an embodiment of this application, and FIG. 6 is a schematic diagram of screw fastening of a fixing plate member fixed to a bezel according to an embodiment of this application. As described above, the fixing members 12 and the fasteners 22 mutually form a screw fastening structure, the fixing members 12 of the plate are screws, the fasteners 22 are a plurality of through-holes, and the screws are fastened to the through-holes, so that the fixing plate member is fixed to the bezel.

In an embodiment of this application, the fasteners are arranged on the bezel in an array manner. That is, the through-holes are arranged on the bezel in an array manner. A gap between the fixing members is equal to a gap between the fasteners.

Further, according to the foregoing content, this application may further include a curved display device. The curved display device comprises: a curved display apparatus. The curved display apparatus includes a display panel and a backlight module, and the backlight module includes a curved bezel. Referring to FIG. 1 and FIG. 2 again, the curved bezel includes: at least one fixing plate member, being a plate and bent of at least one bending angle to form at least one bending, wherein the fixing plate member includes a plurality of fixing members positioned at a periphery of the plate; and a bezel, including a plurality of fasteners corresponding to the fixing members configured to fix with the fasteners.

In an embodiment of this application, the plate has a rectangular shape, or may have a square shape. The bending 11 is parallel to both side edges 13 of the plate, that is, the bending 11 is perpendicular to upper and lower edges 14.

In an embodiment of this application, the bending 11 is located in the center of the plate, so that the plate is symmetrically bent. Especially, the fixing members 12 are separately located on peripheries at both sides of the plate by using the bending 11 as a reference.

In an embodiment of this application, the bending angle θ is less than 90 degrees. More precisely, the bending angle θ is in a range of 0 degrees to 45 degrees.

Next, referring to FIG. 3 and FIG. 4, FIG. 3 is a schematic diagram of a curved bezel according to an embodiment of this application, and FIG. 4 is a schematic diagram of a fixing plate member fixed to a bezel according to an embodiment of this application. In an embodiment of this application, the fixing members 12 and the fasteners 22 mutually form a snapping structure. The fixing members 12 are snapping members, and the fasteners 22 are a plurality of through-holes. The snapping members are snapped with the through-holes, so that the fixing plate member 10 is fixed to the bezel 20. The fixing plate member 10 is made of a metal material.

Referring to FIG. 5 and FIG. 6, FIG. 5 is a schematic diagram of screw fastening of a curved bezel according to an embodiment of this application, and FIG. 6 is a schematic diagram of screw fastening of a fixing plate member fixed to a bezel according to an embodiment of this application. As described above, the fixing members 12 and the fasteners 22 mutually form a screw fastening structure, the fixing members 12 of the plate are screws, the fasteners 22 are a plurality of through-holes, and the screws are fastened to the through-holes, so that the fixing plate member is fixed to the bezel.

In an embodiment of this application, the fasteners are arranged on the bezel in an array manner. That is, the through-holes are arranged on the bezel in an array manner. A gap between the fixing members is equal to a gap between the fasteners.

In this application, after a fixing plate member having a fixed curvature is fixed to a bezel, the bezel has a curvature same as a curvature of the fixing plate member, so that a disadvantage of an unstable curvature of a curved bezel member is alleviated, and the weight of the bezel is reduced, thereby reducing the weight of an entire machine. An obvious effect is achieved when a large curved liquid crystal display panel is used. In addition, a same bezel includes fixing plate members having different curvatures, so that an effect of variable curvatures of a module is achieved. Further, for the bezel provided in this application, in addition to that through-holes of the bezel are snapped and combined with fixing members, another effect is to effectively reduce stress generated in the bezel, so as to achieve a stable curvature.

Terms such as "in some embodiments" and "in each embodiment" are repeatedly used. The terms usually refer to different embodiments, but may also refer to a same embodiment. Terms such as "contain", "have", and "include" are synonyms, unless the terms have other meanings in this specification.

The above merely describes preferred embodiments of this application, but is not intended to limit this application in any form. This application is disclosed above with reference to the preferred embodiments, but this application is not limited thereto. A person skilled in the art may make an equivalent embodiment having some variations or equivalent modifications according to the technical content disclosed above without departing from the scope of the technical solutions of this application. Any simple modifications or equivalent variations and modifications that are substantially made to the foregoing embodiments according to the technologies of this application without departing from the technical solutions of this application are included within the scope of the technical solutions of this application.

What is claimed is:

1. A curved bezel, comprising:
    at least one fixing plate member, being a plate and bent of at least one bending angle to form at least one bending, wherein the fixing plate member includes a plurality of fixing members positioned at a periphery of the plate; and
    a bezel, including a plurality of fasteners corresponding to the fixing members configured to fix with the fasteners, wherein:
    the bending is located in a center of the plate so that the plate is symmetrically bent, the fasteners are arranged on the bezel in an array manner, the fasteners are a plurality of through-holes, a center of the bezel corresponding to the center of the plate of the fixing plate member, and the through-holes being uniformly distributed beside the center of the bezel, and the fixing members are fastened to some of the through-holes located near the center of the bezel, whereby after the fixing plate member is fixed to the bezel, the bezel having a curvature being changed from an original curvature of the bezel to a fixed curvature of the fixing plate member.

2. The curved bezel according to claim 1, wherein the plate has a rectangular shape, and the bending is parallel to both side edges of the plate.

3. The curved bezel according to claim 1, wherein the bending angle is in a range of 0 degrees to 45 degrees.

4. The curved bezel according to claim 1, wherein the fixing members and the fasteners mutually form a snapping structure.

5. The curved bezel according to claim 4, wherein the fixing members are snapping members, and the snapping members are snapped with the through-holes, so that the fixing plate member is fixed to the bezel.

6. The curved bezel according to claim 1, wherein the fixing members and the fasteners mutually form a screw fastening structure, and the fixing members are screws, and the screws are fastened to the through-holes, so that the fixing plate member is fixed to the bezel.

7. The curved bezel according to claim 1, wherein the fixing plate member is made of a metal material.

8. A curved display apparatus, comprising:

a display panel; and a backlight module, comprising a curved bezel, wherein the curved bezel comprises:

at least one fixing plate member, wherein the fixing plate member is a plate and bent of at least one bending angle to form at least one bending, wherein the fixing plate member includes a plurality of fixing members positioned at a periphery of the plate; and a bezel, including a plurality of fasteners corresponding to the fixing members and configured to fix with fasteners, wherein:

the bending is located in a center of the plate so that the plate is symmetrically bent, the fasteners are arranged on the bezel in an array manner, the fasteners are a plurality of through-holes, a center of the bezel corresponding to the center of the plate of the fixing plate member, and the through-holes being uniformly distributed beside the center of the bezel, and the fixing members are fastened to some of the through-holes located near the center of the bezel, whereby after the fixing plate member is fixed to the bezel, the bezel having a curvature being changed from an original curvature of the bezel to a fixed curvature of the fixing plate member.

9. The curved bezel according to claim 8, wherein the plate has a rectangular shape, and the bending is parallel to both side edges of the plate.

10. The curved bezel according to claim 8, wherein the bending angle is in a range of 0 degrees to 45 degrees.

11. The curved bezel according to claim 8, wherein the fixing members and the fasteners mutually form a snapping structure.

12. The curved bezel according to claim 11, wherein the fixing members are snapping members, and the snapping members are snapped with the through-holes, so that the fixing plate member is fixed to the bezel.

13. The curved bezel according to claim 8, wherein the fixing members and the fasteners mutually form a screw fastening structure, and the fixing members are screws, and the screws are fastened to the through-holes, so that the fixing plate member is fixed to the bezel.

14. The curved bezel according to claim 8, wherein the fixing plate member is made of a metal material.

15. A curved display device, comprising a curved display apparatus, wherein the curved display apparatus comprises a display panel and a backlight module, the backlight module comprises a curved bezel, and the curved bezel comprises:

at least one fixing plate member, wherein the fixing plate member is a plate and bent of at least one bending angle to form at least one bending, wherein the fixing plate member includes a plurality of fixing members positioned at a periphery of the plate; and a bezel, including a plurality of fasteners corresponding to the fixing members and configured to fix with fasteners, wherein:

the bending is located in a center of the plate so that the plate is symmetrically bent, the fasteners are arranged on the bezel in an array manner, the fasteners are a plurality of through-holes, a center of the bezel corresponding to the center of the plate of the fixing plate member, and the through-holes being uniformly distributed beside the center of the bezel, and the fixing members are fastened to some of the through-holes located near the center of the bezel, whereby after the fixing plate member is fixed to the bezel, the bezel having a curvature being changed from an original curvature of the bezel to a fixed curvature of the fixing plate member.

* * * * *